(12) United States Patent  (10) Patent No.: US 8,608,073 B2
Baqai et al.  (45) Date of Patent: Dec. 17, 2013

(54) SYSTEM AND METHOD FOR ROBUST REAL-TIME 1D BARCODE DETECTION

(75) Inventors: Farhan Baqai, Fremont, CA (US); Vivek Athalye, Berkeley, CA (US); Neda Nategh, Atherton, CA (US); Todd Sachs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 13/359,489

(22) Filed: Jan. 26, 2012

(65) Prior Publication Data

US 2013/0193211 A1    Aug. 1, 2013

(51) Int. Cl.
*G06K 7/00* (2006.01)
*G06K 19/08* (2006.01)

(52) U.S. Cl.
USPC .................................................. 235/462.04

(58) Field of Classification Search
USPC ............ 235/462.11, 462.41, 462.04; 382/168
See application file for complete search history.

(56) References Cited

U.S. PATENT DOCUMENTS

| | | | | |
|---|---|---|---|---|
| 5,134,272 | A * | 7/1992 | Tsuchiya et al. | 235/462.08 |
| 6,016,366 | A * | 1/2000 | Konstantinides et al. | 382/260 |
| 6,729,544 | B2 * | 5/2004 | Navon | 235/462.14 |
| 7,328,847 | B1 * | 2/2008 | Shen et al. | 235/462.01 |
| 8,170,278 | B2 * | 5/2012 | Zhao et al. | 382/103 |
| 2002/0084330 | A1 * | 7/2002 | Chiu | 235/462.11 |
| 2009/0185236 | A1 * | 7/2009 | Zeng | 358/450 |

\* cited by examiner

*Primary Examiner* — Daniel Hess
*Assistant Examiner* — Steven J Malone
(74) *Attorney, Agent, or Firm* — Wong, Cabello, Lutsch, Rutherford & Brucculeri, LLP

(57) ABSTRACT

A fast image-based barcode detection and recognition technique allows a user of a device to analyze an image containing a barcode, locating the barcode containing region of the image automatically, without requiring a user to frame and align the image. In one embodiment, the technique may locate multiple omni-directional barcode regions simultaneously.

23 Claims, 10 Drawing Sheets

SYSTEM AND METHOD FOR ROBUST REAL-TIME 1D BARCODE DETECTION

BACKGROUND

This disclosure relates generally to the field of barcode detection. More particularly, but not by way of limitation, it relates to a technique for isolating a region of an image containing a barcode.

Barcodes have become an important aspect of modern life, with barcodes printed onto a wide variety of objects. Barcode capture and decoding capabilities have been built into many types of devices, including mobile devices such as smartphones, often using the built-in camera of the device for capturing an image that may contain a barcode. However, numerous challenges can make quick detection and recognition of barcodes difficult and require increased use of processing resources and time. As illustrated in prior art FIG. 1, such challenges include but are not limited to overcoming defocus blur (110), motion blur (120), perspective distortion (130), multiple barcodes (140), complex background and non-centered barcodes (150), rotation (160), poor or uneven illumination (170), and small scale (180).

SUMMARY

This disclosure pertains to device, methods, and computer readable media for implementing a more effective barcode detection technique. In some embodiments, the techniques disclosed herein may partition an image into subimages, which are then analyzed to determine whether they contain a portion of a barcode, and a region of the image containing the barcode based on the subimages that contain the barcode is segmented from the image for providing to a barcode decoder.

Thus, in one embodiment describe herein, a method of detecting a barcode in an image comprises partitioning an image captured by an image capture device into a plurality of subimages; determining the plurality of subimages that contain at least a portion of the barcode; and selecting a region of the image containing the barcode, comprising the plurality of subimages that contain at least a portion of the barcode.

In another embodiment, an apparatus comprises an image sensor; a programmable control device; a memory coupled to the programmable control device, wherein instructions are stored in the memory, the instructions causing the programmable control device to partition an image captured by the image sensor into a plurality of subimages; select a plurality of barcode subimages from the plurality of subimages, according to a predetermined density threshold, a predetermined parallel line threshold, and a predetermined line count threshold; and select an oriented region of the image containing the barcode, comprising the plurality of barcode subimages.

In yet another embodiment, a non-transitory program storage device, readable by a programmable control device, comprises instructions stored thereon for causing the programmable control device to partition an image containing a barcode captured by an image sensor into a plurality of subimages; determine the plurality of subimages that contain at least a portion of the barcode; and select a region of the image containing the barcode, comprising the plurality of subimages that contain at least a portion of the barcode.

The fast image-based barcode detection and recognition techniques described herein allow a user of a device to analyze an image containing a barcode, locating the barcode containing region of the image automatically, without requiring a user to frame and align the image.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the present disclosure is written in terms of handheld personal electronic image capture devices, the techniques described below may be implemented in other types of devices, such as traditional digital cameras or dedicated barcode scanners.

There are multiple types of barcodes, including what are known as linear or 1D barcodes, 2D barcodes, etc. Unless otherwise stated below, references to barcodes in the following refer to 1D barcodes. Although there are numerous 1D barcode encoding schemes, the discussion below does not depend upon any specific 1D barcode encoding scheme, because the decoding of the barcode is outside of the scope of the present invention.

Barcodes are composed of a dense sequence of parallel lines on a contrasting background. The information encoded in the barcodes is encoded in the abrupt transitions of pixel intensities, as they transition between the line and the contrasting background. Such a characteristic means that barcodes may be identified by edge detecting an intensity image. In the discussion below, an edge is defined as a discontinuity in an intensity gradient, and an edge pixel is defined as a pixel location of the gradient discontinuity, typically expressed in row, column coordinates.

Figure 1:
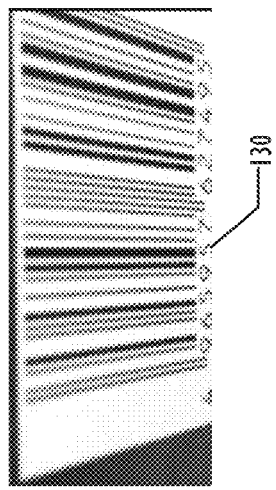
FIG. 1 illustrates examples of challenges causes by various distortions of barcodes according to the prior art.
Figure 1:
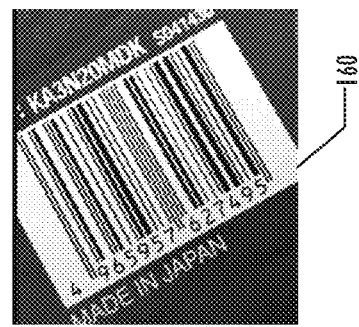
Figure 1:
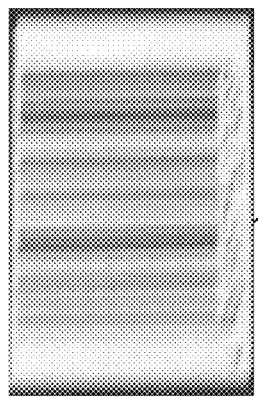
Figure 1:
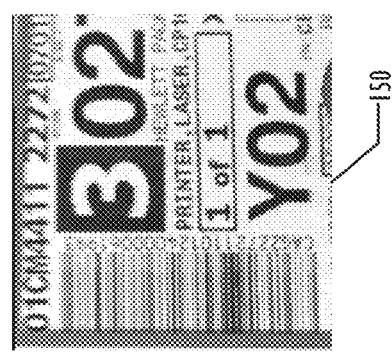
Figure 1:
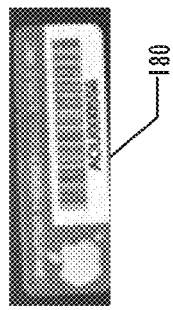
Figure 1:
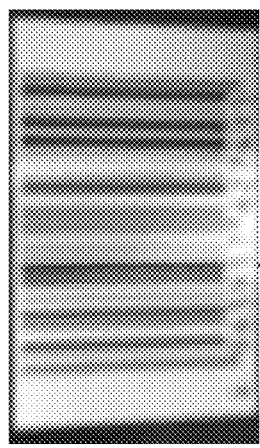
Figure 1:
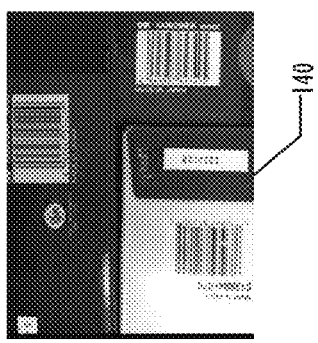
Figure 1:
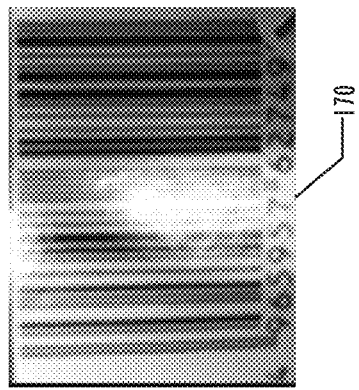
Figure 2:
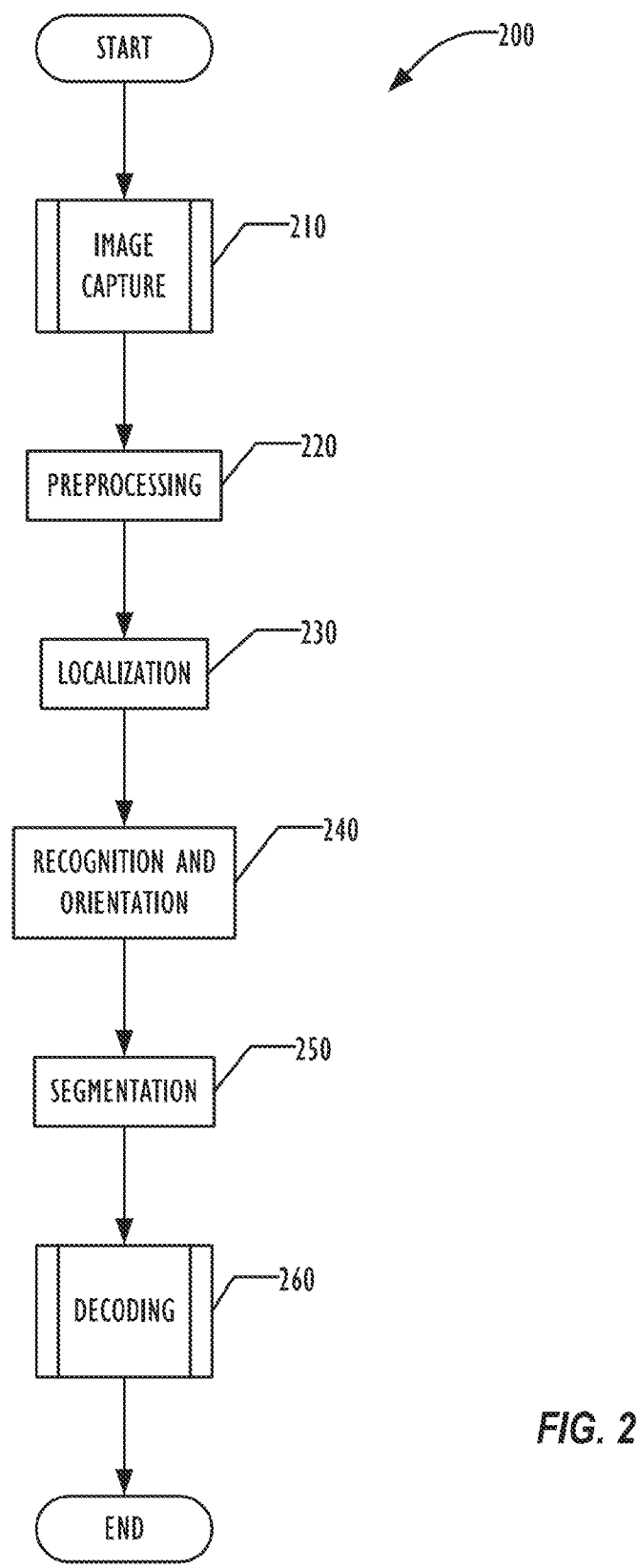
FIG. 2 illustrates, in flowchart form, an embodiment of a technique for detecting barcodes.

FIG. 2 is a flowchart illustrating a technique 200 for detecting barcodes according to one embodiment. In block 210, an image is captured by an electronic device that may contain a barcode by an image capture logic of the device, typically a camera. Any image capture technique may be used as desired, and image capture is not discussed further herein. In block 220, the captured image is preprocessed, to generate an edge detected image for further analysis. Once the image has been preprocessed into edge detected image in block 220, various embodiments perform localization, recognition, orientation, and segmentation on the edge image. In block 230, a localization technique is used to locate regions of the image that may contain a portion of a barcode. In block 240, a recognition and orientation technique determines whether the potential barcode regions actually contain a portion of a barcode and the orientation of the barcode. In one embodiment, the recognition and orientation phase may rotate the barcode into a normalized orientation. In block 250, a segmentation technique extracts and crops only the barcode region from the original image, rejecting the rest of the image. Finally, in block 260, a decoder is provided the barcode region and decodes the barcode. Any known barcode decoding technique may be used by the decoder and decoding is not discussed further herein.

Preprocessing

Figure 3:
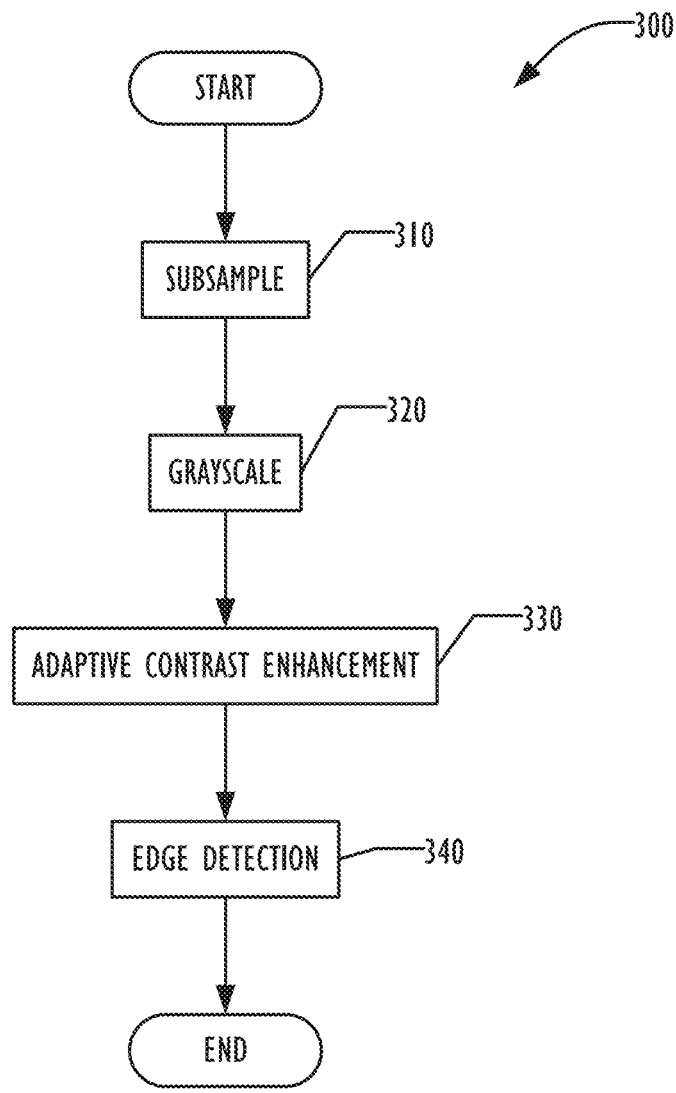
FIG. 3 illustrates, in flowchart form, an embodiment of an image preprocessing technique according to one embodiment.

Prior to beginning the localization, recognition, orientation, and segmentation phases, the captured image may be preprocessed into an edge detected image. FIG. 3 is a flowchart illustrating a preprocessing technique 300 according to one embodiment. In block 310 the original image may be subsampled to a predetermined number of pixels, such as 100,000 pixels. In block 320, the subsampled image is converted into a grayscale image. The camera providing the image to be used for barcode detection typically provides a color image, but color is generally irrelevant in barcode detection. The subsampled image in one embodiment may therefore be preprocessed by performing color masking to eliminate the chroma values and leave only the luminance values of the image, converting the luminance values into a grayscale image. Color masking attempts to black out highly colorful parts of the image based on the pixel RGB distributions, to avoid getting irrelevant edges in the edge detection stage. For example, text regions nearby the barcode region that are printed on a colorful background can produce lots of undesired parallel edges because of the shapes of alphabets. In one embodiment, the hardware of the device performing the barcode detection techniques may provide the image as a 10-bit grayscale image. Other embodiments may use software to perform the conversion from a color image to a grayscale image. In one embodiment, adaptive contrast enhancement may be performed in block 330 to enhance the grayscale image.

Figure 4:
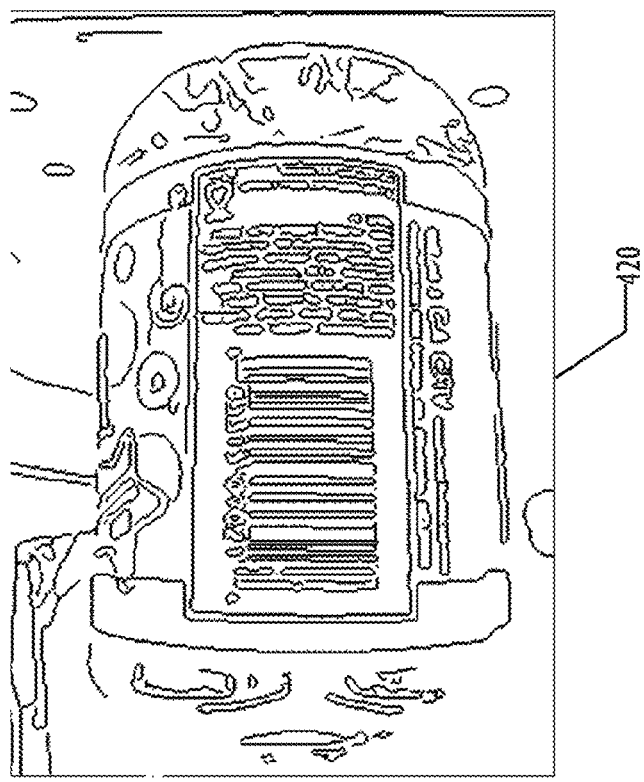
FIG. 4 illustrates converting a grayscale image to an edge-detected image according to one embodiment.
Figure 4:

Once the grayscale image has been produced, an edge detection technique may be performed in block 340 to locate edge pixels. In one embodiment, illustrated in FIG. 4, a Canny edge detection technique may be used to convert grayscale image 410 into edge detected image 420, using non-maximum suppression and hysteresis thresholding values to produce edge pixels that form continuous lines and to reject scattered noisy edge pixels. Although Canny edge detection is preferred, other edge detection techniques may be used as desired.

The edge detected grayscale image is then used for the localization, recognition, and orientation phases.

Localization

Figure 5:
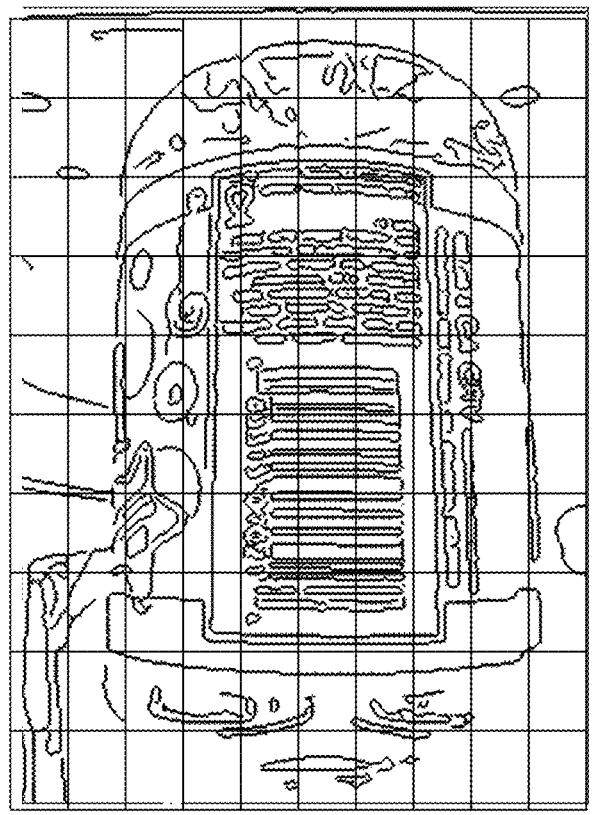
FIG. 5 illustrates a localized edge detected image partitioned into subimages according to one embodiment.

Embodiments of the localization technique break up the subsampled image into a predetermined number of subimages, in one embodiment, 100 subimages, each containing 1% of the subsampled image, such as the image 500 of FIG. 5, where the subimages are illustrated with gridlines.

The size (and thus number) of subimages is a tradeoff between detection and recognition issues. The smaller the subimages, the more samples of the barcode are obtained, which can give localization with greater accuracy, allowing the detection of smaller barcodes and barcodes that are further away from the camera. However, if the subimage is too small, it may contain no lines and thus no longer reliably represent a barcode region. In addition, a camera too close to the object may cause similar problems.

Larger subimages that are representative of barcode regions, on the other hand, can improve recognition by allowing good estimates of the number of edge pixels, gradient properties, and the number of lines for each subimage, as well as comparing those properties across subimages. However, if the subimage is too large, it may contain part of the background region in addition to the barcode, thus no longer reliably represent a barcode region. In addition, a camera too far from the object may cause similar problems.

In addition, increasing the number of subimages may affect the speed in which all of the subimages may be processed by the localization technique. In one embodiment, using subimages that contain 1% of the subsampled image may allow reliable localization when the camera is placed up to 1 foot away from the barcode. Distances greater than 1 foot may be used, but may cause a decreased likelihood of success of reading the barcode by the barcode decoder.

Recognition and Orientation

Once the image has been divided into subimages, various embodiments then attempt to select regions of dense parallel lines in the edge pixels of each subimage, to find subimages of the image that may have barcodes. Barcode-containing subimages are invariant to scale, rotation, and perspective distortions, when considered along with orientation information produced in the orientation phase described below.

Figure 6:
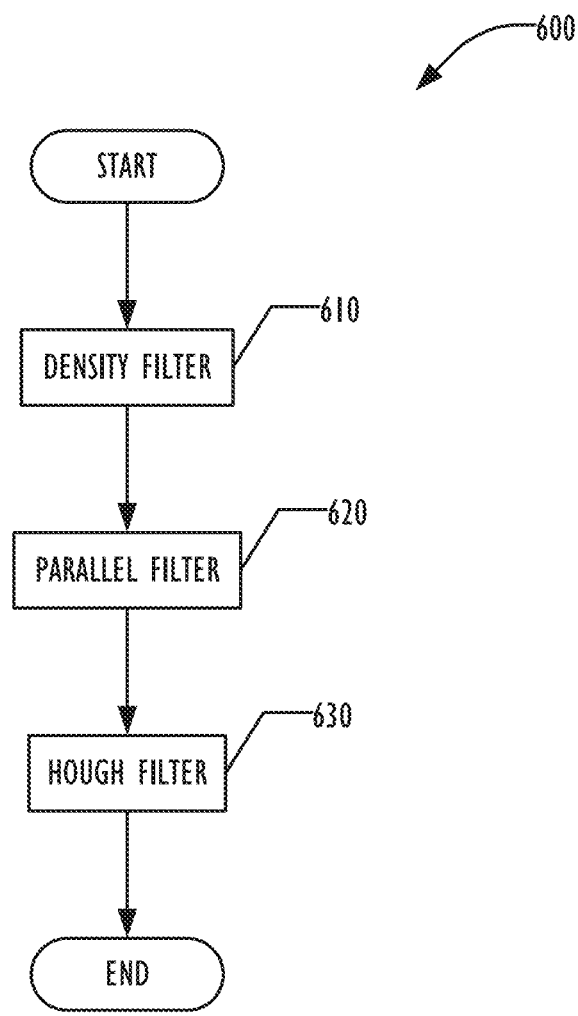
FIG. 6 illustrates, in flowchart form, a technique for recognizing subimages containing barcodes according to one embodiment.

In one embodiment, the recognition and orientation phase 600 illustrated in FIG. 6 comprises using three filters: a density filter 610 to find subimages with dense lines, a parallel line filter 620 to find subimages with parallel lines, and a Hough line filter 630 to determine how many lines are in the subimage. These filters are typically implemented using software in the device, but may be implemented in software, firmware, or hardware as desired. The determination may be sequential, as illustrated in FIG. 6, first finding subimages with dense lines using the density filter 610, then refining that group using the parallel filter 620 to eliminate subimages with dense non-parallel lines, then further refining that group using the Hough filter 630 to select only subimages with sufficient numbers of parallel lines. Alternatively, the determination of the density filter 610, parallel filter 620, and Hough filter 630 may be performed in parallel, with the recognition phase 600 selecting subimages that are marked by each of the filters as meeting the criteria of that filter.

The density filter 610 in one embodiment selects subimages according to a number of edge pixels. In one embodiment, the density is calculated using the number of edge pixels in the subimage divided by the number of pixels in the subimage. A subimage having a number of edge pixels that meets or exceeds a predetermined threshold amount of the pixels in the subimage may be a barcode subimage. In one embodiment, the threshold value is that 60% of the subimage pixels are edge pixels, but other threshold values can be used. By restricting the consideration of subimages to only subimages with a sufficient density of lines, the effects of noise in the original image may be reduced.

The parallel filter 620 in one embodiment selects subimages that contain parallel lines. If a subimage contains more than a predetermined threshold number of edge pixel gradients in any one direction, the subimage may contain a barcode portion. In one embodiment, the gradient direction of edge pixels may be quantized into four bins, each corresponding to one of the four angles 0°-45° (and 180°-225°), 45°-90° (and 225°-270°), 90°-135° (and 270°-315°), and 135°-180° (and 315°-360°). Other angles and number of angles may be used as desired to define different numbers and size bins. If a subimage has more than the threshold value of edge pixels in more than one of the quantized directions, the subimage may have barcode portions at more than one orientation. In one embodiment, a threshold value of 65% may be used for selecting subimages with parallel lines. In one embodiment, as pixels are quantized into the appropriate bins, the subimage may be marked as containing parallel lines as soon as enough pixels have been quantized into a bin to meet the threshold value, and the quantization terminated. In other embodiments, all pixels in the subimage are quantized into one of the several bins, and the subimage is not marked as containing parallel lines until all pixels have been quantized.

A Hough line filter 630 may be used to find lines in the subimage, and denoise the data. In one embodiment, a singular value decomposition may be performed on the subimage to determine an orientation of lines in the subimage prior to performing the Hough line filtration, using a higher resolution for orientation angle than only four quantized angle values, to enhance the performance of the Hough line filter 630.

A singular value decomposition of an m×n matrix M is a factorization of the form $M=U\Sigma V^T$, where U is an m×m unitary matrix, $\Sigma$ is an m×n rectangular diagonal matrix values on the diagonal, and $V^T$ is an n×n unitary matrix. The diagonal entries $\sigma_1, \sigma_2, \ldots, \sigma_n$ of $\Sigma$ are known as the singular values of M, while the m columns of U and the n columns of V are known as the left and right singular vectors of M. Any technique for calculating the singular value decomposition may be used, however, because singular value decomposition can be very time consuming, faster techniques are preferred for real-time processing.

Figure 7:
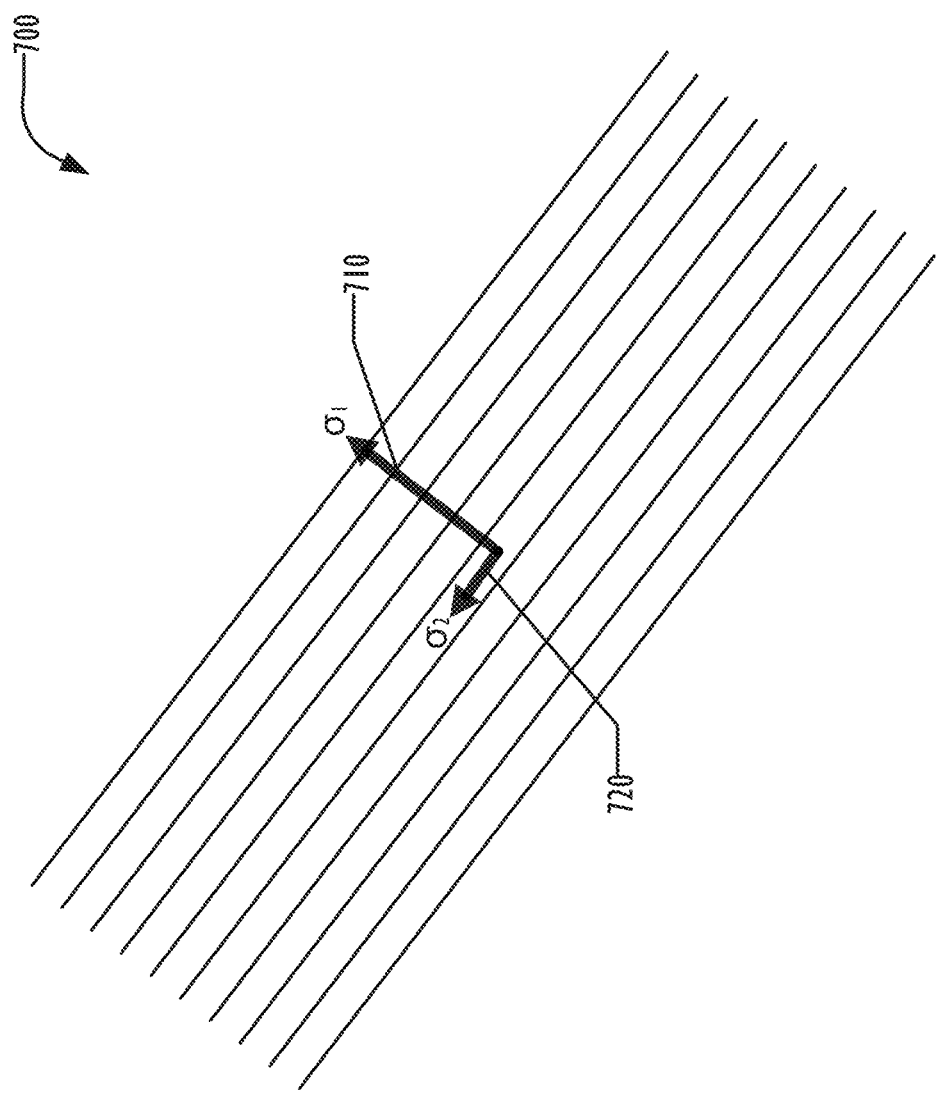
FIGS. 7 and 8 illustrate a technique for determine orientation of a barcode using singular value decomposition according to one embodiment.

The principal singular vector indicates the direction of the greatest gradient variance, thus providing an orientation of the lines in the subimage. In one embodiment, the singular values can be used as input to a certainty filter to provide a significance test for the singular value decomposition, where a subimage that is not significantly oriented may be filtered out by the certainty filter, leaving only subimages that are clearly oriented. For example, FIG. 7 illustrates a collection of lines 700 in which the gradient has a principal orientation along line 710 (corresponding to a principal singular vector), and a secondary orientation along line 720, but the singular values $\sigma_1$ and $\sigma_2$ can be used to determine that the lines have a significant orientation by the calculation of $$\text{Significance} = \frac{(\sigma_1 - \sigma_2)}{(\sigma_1 + \sigma_2)}$$

Figure 8:
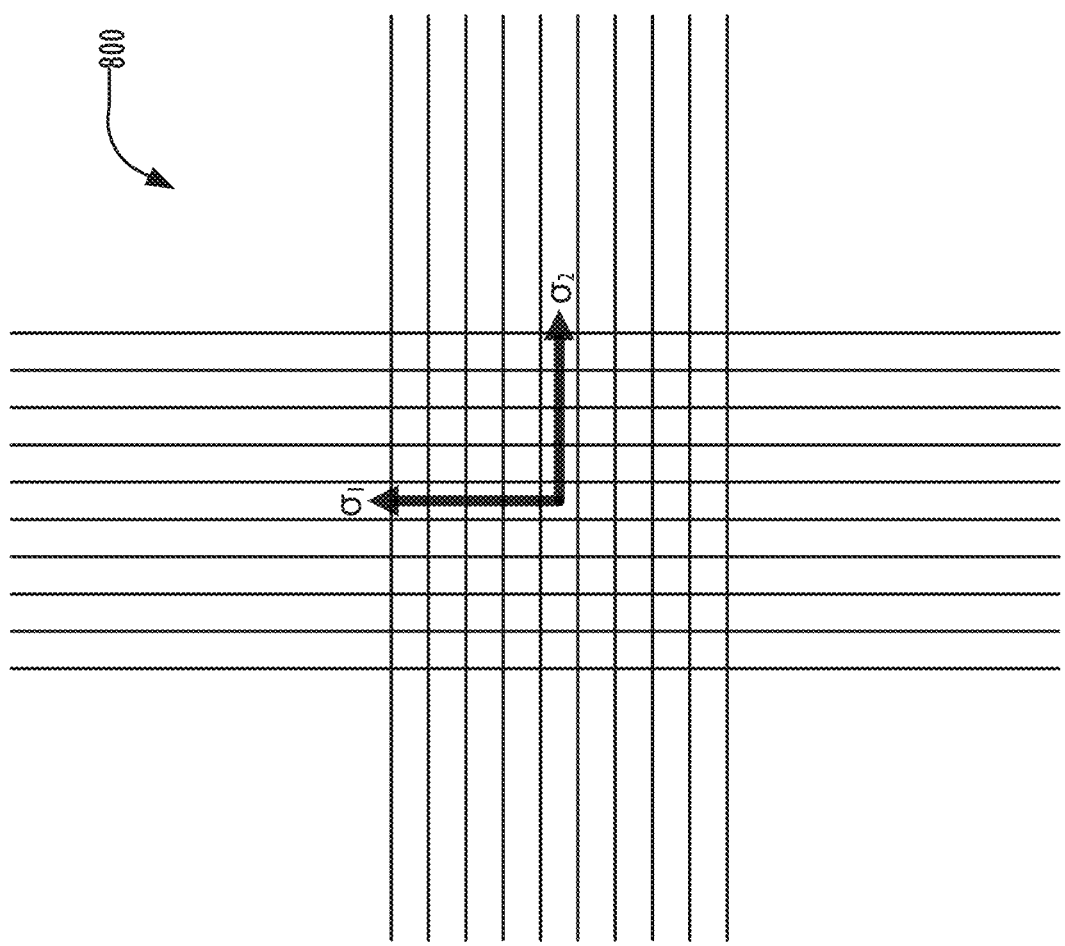

If the significance exceeds a predetermined threshold value, the subimage may be considered to be strongly oriented. If the significance is less than the threshold value, the subimage may be considered as not strongly oriented, and thus less likely to contain a barcode. An example of a non-oriented image is illustrated in FIG. 8, in which lines 800 run in two distinct directions, resulting in singular values $\sigma_1$ and $\sigma_2$ that are equal, thus the orientation of the principal singular vector has zero significance.

Distinguishing subimages that are non-oriented from subimages that are oriented by such a certainty filter, can allow the Hough line filter to be more efficient by filtering out subimages with low orientation significance and directing the Hough filter to operate only in the orientation of the subimage.

In one embodiment, the Hough line filter 630 results in a number of lines detected in the subimage, and a subimage may be marked as containing a barcode if the number of lines meets or exceeds a threshold value (for example, more than 3 lines).

The use of a Hough filter is illustrative and exemplary, and other techniques for determining the number of lines in a subimage may be used as desired.

In one embodiment, the predetermined thresholds used in the density analysis, parallel filter and Hough line filters described above may be based on assumptions about the distance between the camera and objects in the image, as well as the color map of the image. These assumptions and the resulting threshold values may be adaptive to image statistics, such as image intensity or contrast distribution, and may be improved by image enhancement or texture analysis techniques.

Segmentation

Figure 9:
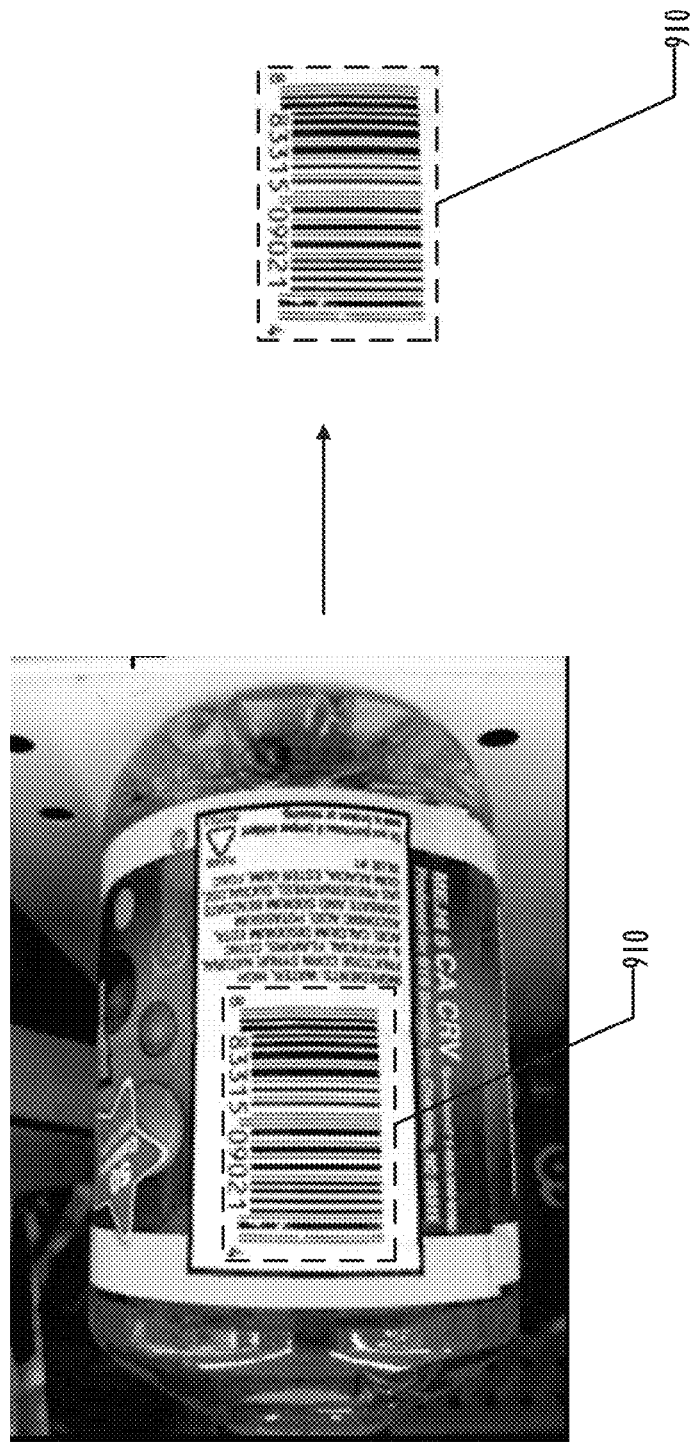
FIG. 9 illustrates segmenting a bounded region of an image that contains a barcode according to one embodiment.

Finally, having now localized the barcode into subimages, and recognized and oriented the subimages that contain portions of barcodes, a segmentation phase is employed to provide a cropped and rotated bounding box around a region that contains a barcode. This region typically will contain multiple subimages that have been marked by the recognition phase as containing a portion of a barcode. In one embodiment, the segmentation phase may create a horizontal-vertical contrast map of the bounding box, perform block smoothing on the contrast map, create a colormap of the contrast map, then binarize the colormap to black and white values, and do a morphological closing of the binarized contrast map, to generate a segmented barcode region. As illustrated in FIG. 9, the segmented barcode region 910 may then be extracted from the image as a region with clean edges and provided to a barcode decoder for decoding the information encoded into the barcode.

By performing localization, recognition and orientation, and segmentation operations on the image, the barcode detection technique described above allows extraction of the region that contains the barcode from the image, rejecting the rest of the image. The detection technique is scale invariant, rotation invariant, and is robust, allowing processing of images with low image quality.

Figure 10:
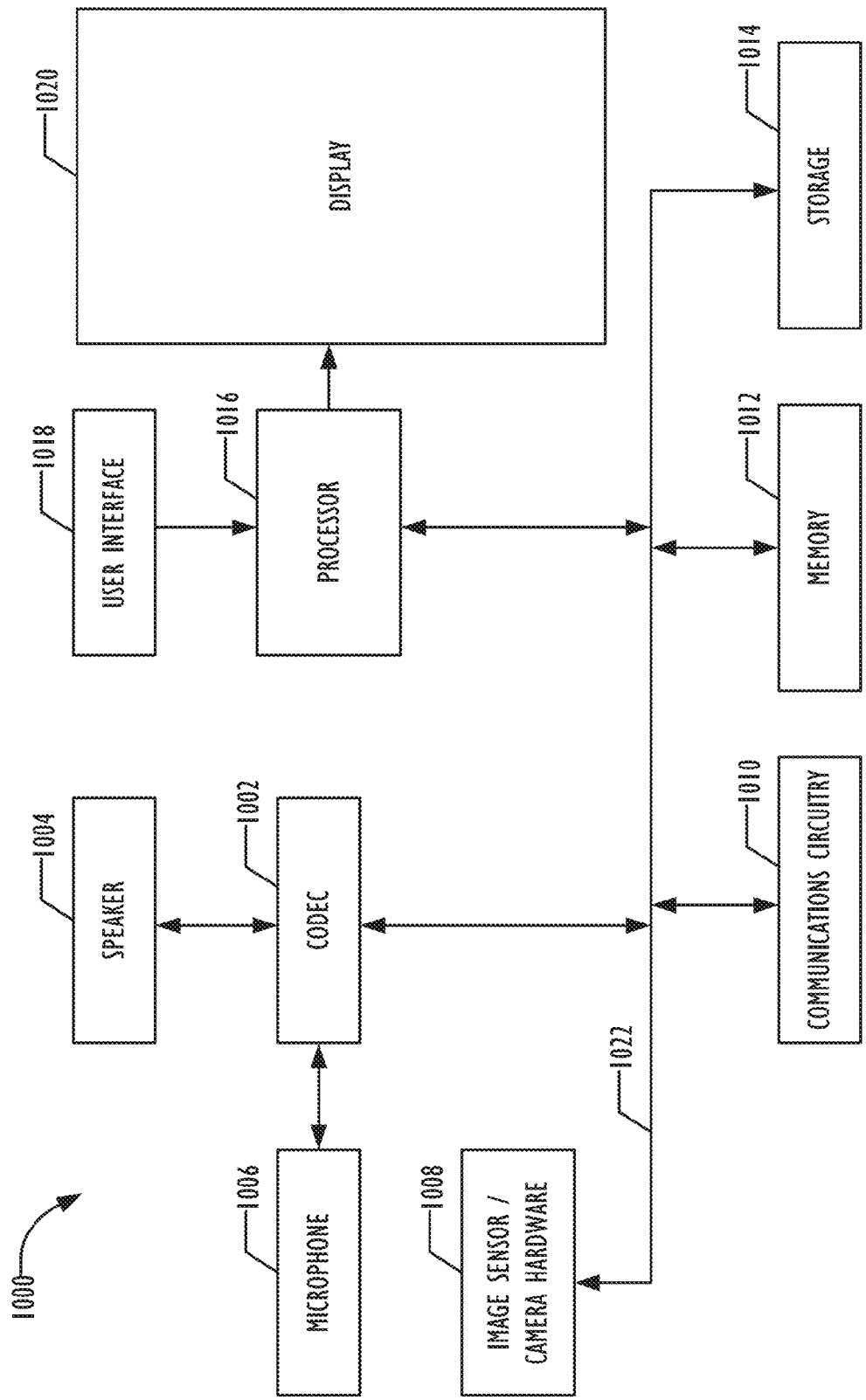
FIG. 10 is a block diagram illustrating an electronic device according to one embodiment in which the barcode detection techniques may be implemented.

FIG. 10 is a simplified functional block diagram illustrating a electronic device FIG. 1000 according to one embodiment that can implement the techniques described above. The electronic device FIG. 1000 may include a processor FIG. 1016, display FIG. 1020, microphone FIG. 1006, audio/video codecs FIG. 1002, speaker FIG. 1004, communications circuitry FIG. 1010, an image sensor with associated camera hardware FIG. 1008 for performing image capture, user interface FIG. 1018, memory FIG. 1012, storage device FIG. 1014, and communications bus FIG. 1022. Processor FIG.

1016 may be any suitable programmable control device and may control the operation of many functions, such as the generation and/or processing of image data, as well as other functions performed by electronic device FIG. 1000. Processor FIG. 1016 may drive display FIG. 1020 and may receive user inputs from the user interface FIG. 1018. An embedded processor provides a versatile and robust programmable control device that may be utilized for carrying out the disclosed techniques.

Storage device FIG. 1014 may store media (e.g., image and video files), software (e.g., for implementing various functions on device FIG. 1000), preference information, device profile information, and any other suitable data. Storage device FIG. 1014 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory FIG. 1012 may include one or more different types of memory which may be used for performing device functions. For example, memory FIG. 1012 may include cache, ROM, and/or RAM. Communications bus FIG. 1022 may provide a data transfer path for transferring data to, from, or between at least storage device FIG. 1014, memory FIG. 1012, and processor FIG. 1016. Although referred to as a bus, communications bus FIG. 1022 is not limited to any specific data transfer technology. User interface FIG. 1018 may allow a user to interact with the electronic device FIG. 1000. For example, the user interface FIG. 1018 can take a variety of forms, such as a button, keypad, dial, a click wheel, or a touch screen.

In one embodiment, the electronic device FIG. 1000 may be an electronic device capable of processing and displaying media, such as image and video files. For example, the electronic device FIG. 1000 may be a device such as such a mobile phone, personal data assistant (PDA), portable music player, monitor, television, laptop, desktop, and tablet computer, or other suitable personal device. In other embodiments, the electronic device FIG. 1000 may be dedicated to the barcode scanning functionality.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of detecting a barcode in an image, comprising:
    partitioning an image captured by an image capture device into a plurality of subimages;
    determining the plurality of subimages that contain at least a portion of the barcode, comprising:
        filtering the plurality of subimages using a parallel line filter, comprising:
            quantizing edge pixels contained in a subimage into one of a predetermined number of bins corresponding to an angular direction of an edge pixel gradient; and
    selecting a region of the image containing the barcode, comprising the plurality of subimages that contain at least a portion of the barcode.

2. The method of claim 1, further comprising:
    preprocessing the image prior to partitioning the image, comprising:
        converting the image from a color image to a grayscale image;
        subsampling the image to a predetermined number of pixels; and
        converting the image into an edge-detected image.

3. The method of claim 1, further comprising:
    providing the selected region of the image to a barcode decoder.

4. The method of claim 1, wherein determining the plurality of subimages that contain at least a portion of the barcode further comprises:
    filtering the plurality of subimages using a density filter; and
    filtering the plurality of subimages according to a number of edge pixel lines in a subimage.

5. The method of claim 4, wherein filtering the plurality of subimages using a density filter comprises:
    comparing a number of edge pixels contained in a subimage to a predetermined threshold value.

6. The method of claim 1, wherein quantizing edge pixels is performed on all pixels of the subimage.

7. The method of claim 4, wherein filtering the plurality of subimages according to a number of edge pixel lines in a subimage comprises:
    filtering the plurality of subimages with a Hough line filter.

8. The method of claim 7, wherein filtering the plurality of subimages according to a number of edge pixel lines in a subimage comprises:
    calculating a singular value decomposition of a subimage;
    calculating an orientation of the barcode in the subimage from the singular value decomposition of the subimage; and
    filter the plurality of subimages according to a number of edge pixel lines in the subimage having the calculated orientation of the barcode.

9. The method of claim 8, wherein filtering the plurality of subimages according to a number of edge pixel lines in a subimage further comprises:
    calculating a significance of the orientation; and
    filtering out subimages wherein the significance of the orientation is less than a predetermined threshold value.

10. An apparatus, comprising:
    an image sensor;
    a programmable control device;
    a memory coupled to the programmable control device, wherein instructions are stored in the memory, the instructions causing the programmable control device to:
        partition an image captured by the image sensor into a plurality of subimages;
        select a plurality of barcode subimages from the plurality of subimages, according to a predetermined density threshold, a predetermined parallel line threshold, and a predetermined line count threshold, comprising instructions to cause the programmable control device to:
            filter the plurality of images using a parallel line filter, comprising instructions that cause the programmable device to:

quantize edge pixels into one of a predetermined number of bins corresponding to an angular direction of an edge pixel gradient; and select an oriented region of the image containing the barcode, comprising the plurality of barcode subimages.

11. The apparatus of claim 10, wherein the instructions further cause the programmable control device to:
preprocess the image before the image is partitioned into subimages, comprising causing the programmable control device to:
subsample the image to a predetermined number of pixels.

12. The apparatus of claim 10, wherein the instructions further cause the programmable control device to:
preprocess the image before the image is partitioned into subimages, comprising causing the programmable control device to:
convert the image into a grayscale image.

13. The apparatus of claim 10, wherein the image sensor produces a grayscale image.

14. The apparatus of claim 10, wherein the instructions that cause the programmable control device to select a plurality of barcode subimages from the plurality of subimages, according to a predetermined density threshold, a predetermined parallel line threshold, and a predetermined line count threshold comprise instructions to cause the programmable control device to:
filter the plurality of images using a density filter, the density filter comparing a number of edge pixels contained in a subimage to a predetermined threshold value.

15. The apparatus of claim 10, wherein the instructions that cause the programmable control device to select a plurality of barcode subimages from the plurality of subimages, according to a predetermined density threshold, a predetermined parallel line threshold, and a predetermined line count threshold comprise instructions to cause the programmable control device to:
filter the plurality of subimages using a line count filter.

16. The apparatus of claim 15, wherein the line count filter is a Hough line filter.

17. The apparatus of claim 15, wherein the instructions that cause the programmable control device to select a plurality of barcode subimages from the plurality of subimages, according to a predetermined density threshold, a predetermined parallel line threshold, and a predetermined line count threshold comprise instructions to cause the programmable control device to:
determine an orientation of lines in the subimage; and
filter the plurality of subimages using a line count filter, counting only lines having the determined orientation.

18. The apparatus of claim 15, wherein the instructions to cause the programmable control device to determine an orientation of lines in the subimage comprises instructions to cause the programmable control device to:
calculate a singular value decomposition of the subimage; and
determine an orientation of lines from a singular value of the singular value decomposition of the subimage.

19. The apparatus of claim 18, wherein the instructions to cause the programmable control device to determine an orientation of lines in the subimage further comprises instructions to cause the programmable control device to:
determine a significance of the orientation.

20. A non-transitory program storage device, readable by a programmable control device, comprising instructions stored thereon for causing the programmable control device to:
subsample an image containing a barcode captured by an image sensor to a predetermined number of pixels;
convert the subsampled image into a grayscale image,
partition grayscale image into a plurality of subimages;
determine the plurality of subimages that contain at least a portion of the barcode, comprising instructions to cause the programmable control device to:
filter the plurality of images using a parallel line filter, comprising instructions that cause the programmable device to:
quantize edge pixels into one a predetermined number of bins corresponding to an angular direction of an edge pixel gradient; and
select a region of the image containing the barcode, comprising the plurality of subimages that contain at least a portion of the barcode.

21. The non-transitory program storage device of claim 20, wherein the instructions stored thereon to cause the programmable control device to determine the plurality of subimages that contain at least a portion of the barcode comprise instructions to cause the programmable control device to:
select subimages of the plurality of subimages that contain at least a predetermined number of parallel lines.

22. The non-transitory program storage device of claim 21, wherein the instructions stored thereon to cause the programmable control device to select subimages of the plurality of subimages that contain at least a predetermined number of parallel lines comprise instructions for causing the programmable control device to:
filter the plurality of subimages with a density filter; and
determine an orientation of lines in a subimage; and
select a subimage of the plurality of subimages with the predetermined number of parallel lines in the determined orientation.

23. The non-transitory program storage device of claim 20, wherein the instructions stored thereon to cause the programmable control device to select a region of the image containing the barcode, comprising the plurality of subimages that contain at least a portion of the barcode, comprises instructions to cause the programmable control device to:
create a bounding box surrounding a region of the image comprising the plurality of subimages that contain at least a portion of the barcode;
crop and rotate the bounding box to produce a vertical barcode;
generate a contrast map of the region surrounded by the bounding box;
block smooth the contrast map;
create a colormap of the contrast map;
create a binarized contrast map from the colormap; and
morphologically close the binarize contrast map.

* * * * *

UNITED STATES PATENT AND TRADEMARK OFFICE
CERTIFICATE OF CORRECTION

| | | |
|---|---|---|
| PATENT NO. | : 8,608,073 B2 | Page 1 of 1 |
| APPLICATION NO. | : 13/359489 | |
| DATED | : December 17, 2013 | |
| INVENTOR(S) | : Farhan Baqai et al. | |

It is certified that error appears in the above-identified patent and that said Letters Patent is hereby corrected as shown below:

In the Claims

Claim 18, Col. 9, line 53 change "comprises" to --comprise--.

Claim 19, Col. 10, line 1 change "comprises" to --comprise--.

Claim 20, Col. 10, line 10 add --the-- after the word "partition".

Claim 20, Col. 10, line 17 add --of-- after the phrase "into one".

Claim 22, Col. 10, line 37 remove the word "and".

Claim 23, Col. 10, line 46 change "comprises" to --comprise--.

Claim 23, Col. 10, line 58 change "binarize" to --binarized--.

Signed and Sealed this
Twenty-fifth Day of February, 2014

Michelle K. Lee
*Deputy Director of the United States Patent and Trademark Office*